United States Patent [19]

Doi et al.

[11] E Patent Number: Re. 31,666

[45] Reissued Date of Patent: Sep. 11, 1984

[54] BURST-ERROR CORRECTING SYSTEM

[75] Inventors: Toshitada Doi, Yokohama; Akira Iga, Kawasaki, both of Japan

[73] Assignee: Sony Corporation, Tokyo, Japan

[21] Appl. No.: 492,245

[22] Filed: May 6, 1983

Related U.S. Patent Documents

Reissue of:

[64] Patent No.: 4,355,392
Issued: Oct. 19, 1982
Appl. No.: 218,256
Filed: Dec. 19, 1980

U.S. Applications:

[63] Continuation of Ser. No. 31,030, Apr. 28, 1979, abandoned.

[30] Foreign Application Priority Data

Apr. 21, 1978 [JP] Japan ..... 53-47247

[51] Int. Cl.[3] ..... G06F 11/10

[52] U.S. Cl. ..... 371/45; 371/2; 371/43

[58] Field of Search ..... 371/2, 40, 43, 44, 45

[56] References Cited

U.S. PATENT DOCUMENTS

| | | | |
|---|---|---|---|
| 3,409,875 | 11/1968 | De Jager et al. | 371/40 |
| 3,538,497 | 11/1970 | Harmon | 371/43 |
| 3,605,090 | 9/1971 | Burton | 371/43 |
| 3,882,457 | 5/1975 | En | 371/45 |
| 4,032,886 | 6/1977 | En et al. | 371/45 |
| 4,044,328 | 8/1977 | Herff | 371/50 |

FOREIGN PATENT DOCUMENTS

| | | | |
|---|---|---|---|
| 1494415 | 12/1977 | United Kingdom | 371/45 |

*Primary Examiner*—Charles E. Atkinson
*Attorney, Agent, or Firm*—Lewis H. Eslinger; Alvin Sinderbrand

[57] ABSTRACT

In a digital signal transmission system, a predetermined number of words of digital information signals are added bit by bit in a modulo 2 adder to produce a first parity signal. The information signals and the first parity signal are delayed so as to have different delay times to each other, and the signals thus delayed are again added bit by bit in a modulo-2 adder to produce a second parity signal. The predetermined number of words of information signals and first and second parity signals are serially transmitted through a transmission line.

19 Claims, 17 Drawing Figures

FIG. 5

| | $x_{-15}$ | $x_{-13}$ | $x_{-11}$ | $x_{-9}$ | $x_{-7}$ | $x_{-5}$ | $x_{-3}$ | $x_{-1}$ | $x_1$ | $x_3$ | $x_5$ | $x_7$ | $x_9$ |
|---|---|---|---|---|---|---|---|---|---|---|---|---|---|
| $y_{-9}$ | | | | $e_{-9}$ | \| | | \| | | \| | | | | |
| $y_{-7}$ | | | | | $e_{-7}$ | | \| | | \| | | | | |
| $y_{-5}$ | | | | $e_{-8}$ | \| | $e_{-5}$ | \| | | \| | | | | |
| $y_{-3}$ | | | $e_{p-11}$ | | $e_{-6}$ | | $e_{-3}$ | | \| | | | | |
| $y_{-1}$ | | | | $e_{p-9}$ | \| | $e_{-4}$ | \| | $e_{-1}$ | \| | | | | |
| $y_1$ | $e_{81}$ | — | — | — | $e_{p-7}$ | — | $e_{-2}$ | — | $e_1$ | | | | |
| $y_3$ | | $e_{83}$ | | | | $e_{p-5}$ | \| | $e_0$ | \| | $e_3$ | | | |
| $y_5$ | — | — | $e_{85}$ | — | — | — | $e_{p-3}$ | — | $e_2$ | — | $e_5$ | | |
| $y_7$ | | | | $e_{87}$ | | | | $e_{p-1}$ | \| | $e_4$ | | $e_7$ | |
| $y_9$ | — | — | — | — | $e_{89}$ | — | — | — | $e_{p1}$ | — | $e_6$ | — | $e_9$ |
| $y_{11}$ | | | | | | | | | | $e_{p3}$ | | $e_8$ | |
| $y_{13}$ | | | | | | | | | | | $e_{p5}$ | | |
| $y_{15}$ | | | | | | | | | | | | $e_{p7}$ | |

CORRECT MISS TIME
BIT CORRELAT. COEFF.
0.999
0.990
0.900
DEMULTIPLEX
ERROR CORRECT CIRCUIT
43L
43R
42
38
37
41
40
34
16
15
1

BURST-ERROR CORRECTING SYSTEM

Matter enclosed in heavy brackets [ ] appears in the original patent but forms no part of this reissue specification; matter printed in italics indicates the additions made by reissue.

This is a continuation of application Ser. No. 31,030, filed Apr. 28, 1979, now abandoned.

BACKGROUND OF THE INVENTION

1. Field of the Invention

The invention relates to a digital signal transmission system, and in particular is directed to a system for transmitting digital information signals through a transmission medium, such as magnetic tape and microwave line, which is subjected to disturbances causing burst errors, and for enabling correction of the errors which occur in the received digital signal.

2. Description of the Prior Art

Recently, there is proposed to record a digital information signal, such as audio PCM signal, on a magnetic tape by using video tape recorder. However, it is well known that drop-outs causing a burst error frequently occur in the digital signal reproduced from the tape. There are provided several types of transmission system to correct such a burst error as appearing in the reproduced PCM signal. One of the systems is shown in U.S. Pat. No. 3,409,875, in which the PCM signal is transmitted through two lines, one of which includes a predetermined delay. In the receiving side, the outputs of the lines are applied to an output device through a switch controlled by an error responsive device, which is responsive to unequal signals at the outputs of the lines, so that upon detection of the unequal signals the switch is connected to the line having a delay for a predetermined time. Thus, the system can correct the burst errors appearing in the line. However, it is necessary in the above system to provide the two lines for transmission of the same signal. In other words, the capacity of the transmission medium is needed double the usual one.

SUMMARY OF THE INVENTION

An object of the invention is to provide an improved digital signal transmission system in which burst errors contained in the transmitted signal can be corrected at the receiving side.

Another object of the invention is to provide a new system for transmitting digital signals together with parity signals which are composed from the former signals, and for correcting burst errors in the transmitted signal by utilizing the parity signals.

In the system of the invention, a plurality of words of digital information signals are added bit by bit in a modulo 2 adder and a first parity signal is generated for the predetermined number of words of the digital information signals. Each word of the information digital signals and the parity signal are respectively delayed so as to have different delay times to each other. The information signals and first parity signal thus delayed are added bit by bit in a modulo 2 adder to generate a second parity signal for the information and parity signals, and then the predetermined number words of digital information signal and the first and second parity signals are serially transmitted through a transmission line.

The other objects, features and advantages of this invention will be apparent from the following description taken in conjunction with the accompanying drawings.

BRIEF DESCRIPTION OF THE DRAWINGS

FIG. 5 is a table which is used for explanation of the error correcting algorithm of FIG. 4;

DESCRIPTION OF THE PREFERRED EMBODIMENTS

Figure 1:
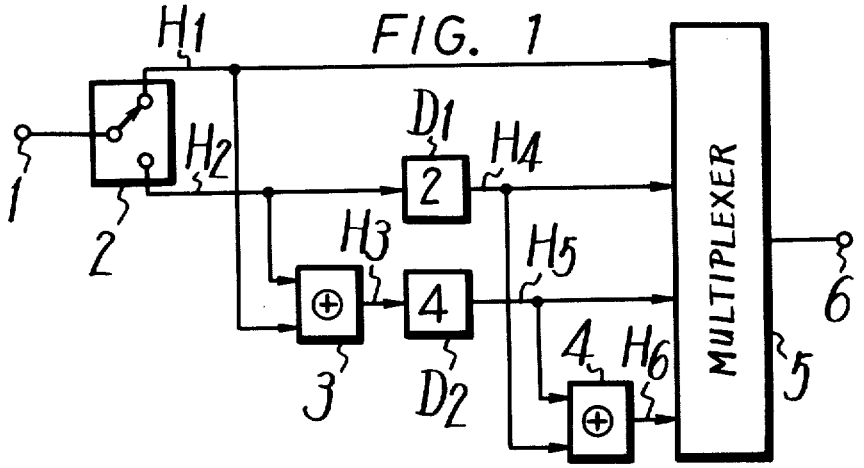
FIG. 1 is a block diagram of an encoder of a system according to this invention.
Figure 2A:
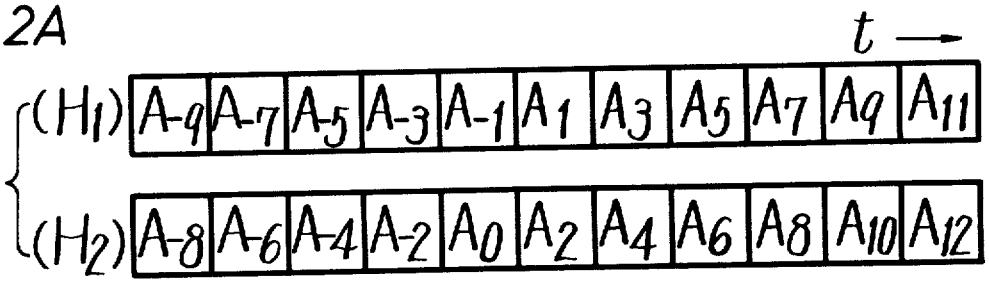
FIGS. 2A to 2G show portions of digital information signals appearing at the encoder of FIG. 1 and parity signals which are formed from the digital information signals.
Figure 2B:
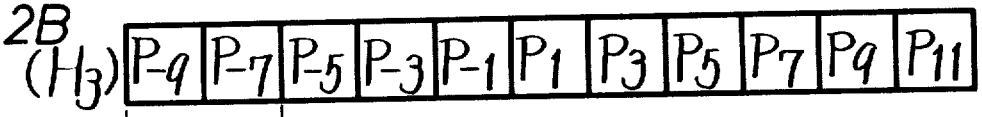
Figure 2C:
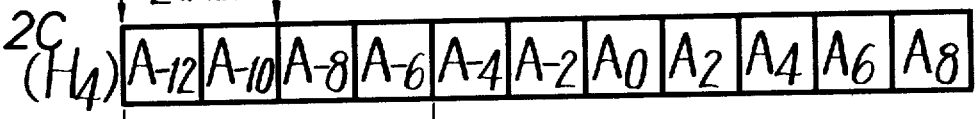
Figure 2D:
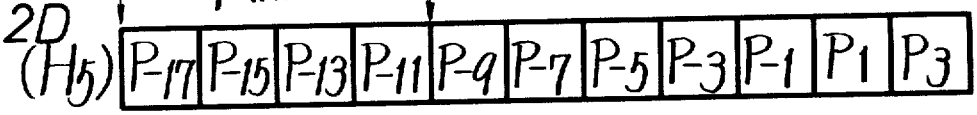
Figure 2E:
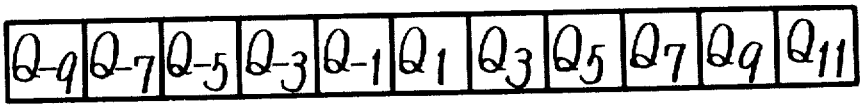

A description will hereinafter be given on one embodiment of this invention with reference to the drawings. FIG. 1 shows an encoder provided at the transmitting side. An information bit sequence with its one word being formed by one of sampled outputs of an analog signal such as an audio signal is supplied through an input terminal 1 to a demultiplexer circuit 2 where the input information bit sequence is converted into a group of its odd-numbered words and a group of its even-numbered words. Thus, a first information bit sequence $H_1$ consisting of odd-numbered words and a second information bit sequence $H_2$ consisting of even-numbered words as shown in FIG. 2A are derived from the demultiplexer circuit 2. These bit sequences $H_1$ and $H_2$ are fed to an adder 3 to derive therefrom a first error correcting bit sequence $H_3$ consisting of parity bits (even parity) as shown in FIG. 2B. The adder 3 and other adders to be mentioned below are all adapted to perform an operation or calculation according to the modulo 2 summation method, and practically formed of exclusive—OR gates. The parity bit sequence $H_3$ is formed from each one word of the two parallel-transmitted bit sequences $H_1$ and $H_2$ shown with the same timing in FIG. 2A, such as $P_1 = A_1 \oplus A_2$, where a symbol $\oplus$ indicates modulo 2 addition. The bit sequences $H_2$ and $H_3$ are then supplied to delay circuits $D_1$ and $D_2$ where they are respectively delayed by two words and four words. The delay circuits $D_1$ and $D_2$ are usually formed of shift registers. Accordingly, bit sequences $H_4$ and $H_5$ shown in FIGS. 2C and 2D are obtained at the output sides of the delay circuits $D_1$ and $D_2$. These bit sequences $H_4$ and $H_5$ are further applied to an adder 4 where they are added bit by bit to produce a second error correcting bit sequence $H_6$ consisting of parity bits (even parity) as shown in FIG. 2E, each word thereof being formed from each word of the bit sequences $H_4$ and $H_5$ at the same timing. The addition performed in the adder 4 is $Q_1=A_{-2}\oplus P_{-7}$, by way of example. These four bit sequences $H_1$, $H_4$, $H_5$ and $H_6$ are applied to a multiplexer circuit 5. These bit sequences constitute a code formation of a matrix type of four rows by plural columns, and respective words are sequentially seriated at every column of this code formation to obtain a serial data in an order of, for example, $A_1$, $A_{-2}$, $P_{-7}$, $Q_1$, $A_3$. $A_0$, $P_{-5}$, $Q_3$,—at an output terminal 6. This serial data is modulated and amplified, if necessary, before being transmitted.

Figure 3:
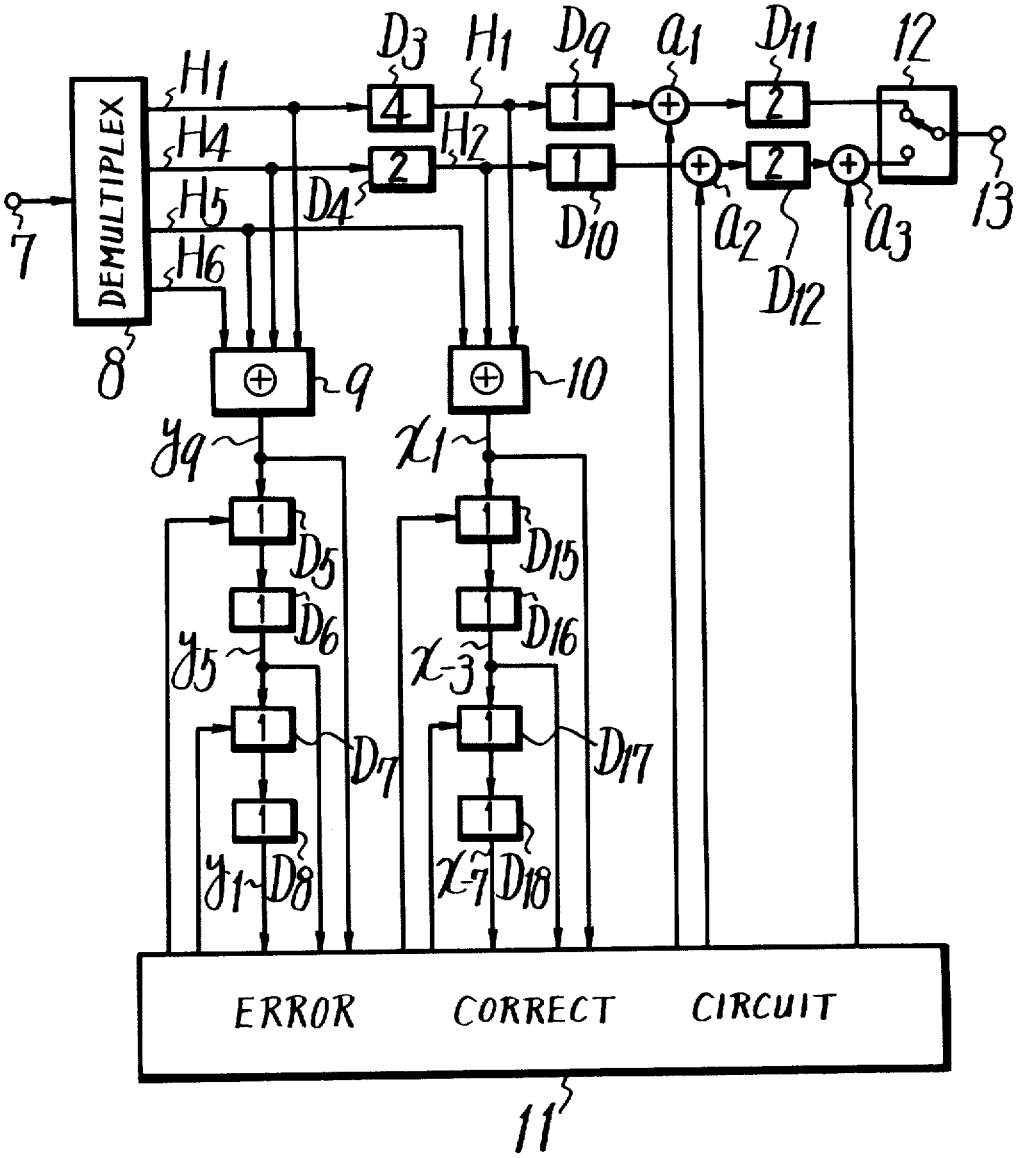
FIG. 3 is a block diagram of a decoder of the system according to this invention.

FIG. 3 shows a decoder provided at the receiving side. A received serial data, which is demodulated and amplified as occasion demands, is supplied through an input terminal 7 to a demultiplexer circuit 8, where the received serial data is converted into four parallel-transmitted bit sequences $H_1$, $H_4$, $H_5$ and $H_6$. The bit sequences $H_1$ and $H_4$ are respectively fed to delay circuits $D_3$ and $D_4$ to be delayed by four words and two words, respectively. Bit sequences appearing at the output sides of the delay circuits $D_3$ and $D_4$ become respectively $H_1$ and $H_2$. This is, in the decoder, four bit sequences $H_1$, $H_4$, $H_5$ and $H_6$ in the same time relation as in the encoder are obtained, and then three bit sequences $H_1$, $H_2$ and $H_5$ in the same time relation as in the encoder are obtained. In order to restore the time relation to the original state as described above, a data synchronizing signal is added, for example, at every four words of the serial data to be transmitted.

The bit sequences $H_1$, $H_4$, $H_5$ and $H_6$ are supplied to an adder 9 by every one word, and the bit sequences $H_1$, $H_2$ and $H_5$ are supplied to an adder 10 by every one word. The adders 9 and 10 are used for forming syndromes. Since convolutional codes are used in this invention, syndromes from the adders 9 and 10 are respectively supplied to an error correcting logical circuit 11 through a series circuit for four 1-word delay circuits $D_5$ to $D_8$ and a series circuit of four 1-word delay circuits $D_{15}$ to $D_{18}$. Thus, the syndrome derived from the adders 9 and 10, syndromes derived from the respective last stages of the series circuits, and syndromes derived from respective predetermined interstages thereof are fed to the error correcting logical circuit 11. Meanwhile, the bit sequences $H_1$ and $H_2$ from the delay circuits $D_3$ and $D_4$ are respectively applied through 1-word delay circuits $D_9$ and $D_{10}$ to error correcting adders $a_1$ and $a_2$, the outputs of which are supplied to 2-word delay circuit $D_{11}$ and $D_{12}$, and an output of the delay circuit $D_{12}$ applied to an error correcting adder $a_3$. Outputs of delay circuit $D_{11}$ and the adder $a_3$ are fed to a multiplexer circuit 12 to obtain an error-corrected serial data at its output terminal 13. The delay circuits $D_9$ and $D_{10}$ are provided to maintain a time required for a logic operation of the error correcting logical circuit 11, and the delay circuits $D_{11}$ and $D_{12}$ are provided to correct an error before two words and also to keep a synchronizing relation of data. Though not shown, the serial data from the output terminal 13 is PCM-demodulated so that the analog signal can be obtained.

An error correcting operation of the decoder will now be described. If an erroneous word contained in received one word is taken as e, and a subscript of word number is attached to e in order to show its corresponding relation with each word of the formation bit sequence and parity bit sequence, the syndrome formed by the adder 9 is successively expressed as follows:

$$y_1=e_1\oplus e_{-2}\oplus e_{p-7}\oplus e_{q1}$$

$$y_3=e_3\oplus e_0\oplus e_{p-5}\oplus e_{q3}$$

$$y_5=e_5\oplus e_2\oplus e_{p-3}\oplus e_{q5}$$

$$y_7=e_7\oplus e_4\oplus e_{p-1}\oplus e_{q7}$$

$$y_9=e_9\oplus e_6\oplus e_{p1}\oplus e_{q9}$$

Also, the syndrome formed by the adder 10 is successively expressed as follows:

$$x_{-7}=e_{-7}\oplus e_{-6}\oplus e_{p-7}$$

$$x_{-5}=e_{-5}\oplus e_{-4}\oplus e_{p-5}$$

$$x_{-3}=e_{-3}\oplus e_{-2}\oplus e_{p-3}$$

$$x_{-1}=e_{-1}\oplus e_0\oplus e_{p-1}$$

$$x_1=e_1\oplus e_2\oplus e_{p1}$$

Figure 2F:
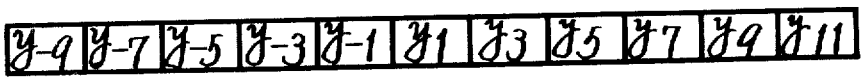
Figure 2G:
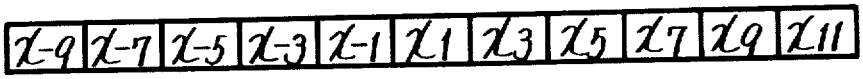

If there is no error, all the bits of these syndromes will become "0". Probability of obtaining a relation of $e_i+e_j=0$ ($e_1\neq 0$ and $e_j\neq 0$) is $2^{-n}$, where n(bit) is the word length. If the word length n is selected sufficiently long, a probability that two erroneous words $e_i$ and $e_j$ become equal by chance is negligibly lessened. Further, timings of producing the syndromes by the adders 9 and 10 will become those shown in FIGS. 2F and 2G corresponding to the information bit sequences.

Figure 4:
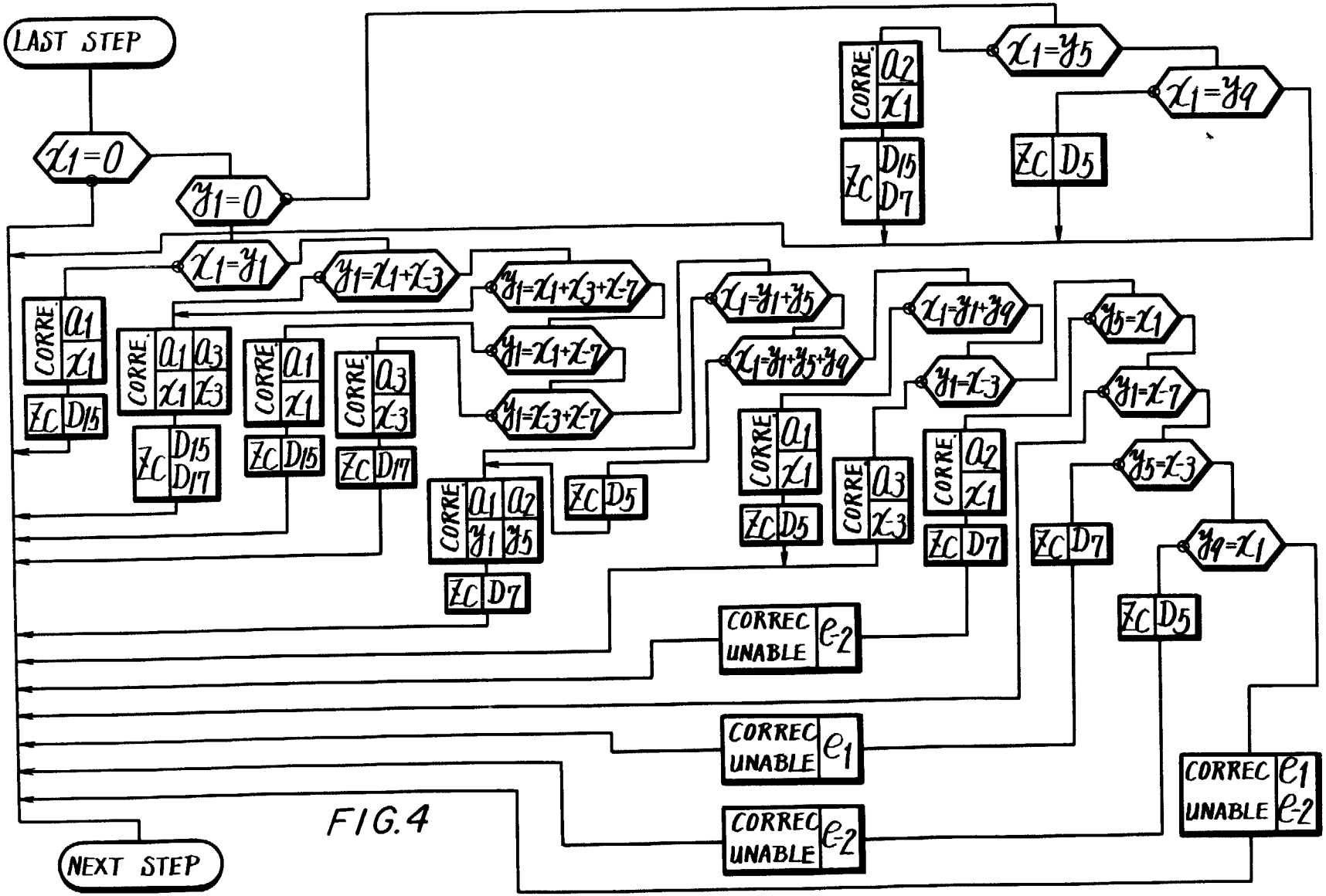
FIG. 4 is a flow chart showing algorithm of error correcting by the system of FIG. 3.

FIG. 4 is a flow chart showing an error correcting logical operation of the error correcting logical circuit 11. In FIG. 4, the side of a decision block attached with a circle mark (O) means "yes", and the side thereof attached with no circle mark means "no". Further, $Z_c$ implies a clear operation such that all the bits of a syndrome held at corresponding delay circuit are made "0". FIG. 5 shows a mutual relation of syndromes. The syndromes from the adder 9 are formed by respective erroneous words in the horizontal direction of FIG. 5, and the syndromes from the adder 10 are formed by respective erroneous words in the vertical direction of FIG. 5.

At the timings where the syndromes ($y_1$, $y_5$, $y_9$) and ($x_{-7}$, $x_{-3}$, $x_1$) are applied to the error correcting logical circuit 11, erroneous words $e_1$, $e_2$ and $e_{-2}$ respectively contained in respective information words $A_1$, $A_2$, and $A_{-2}$ can be corrected, and predetermined syndromes are added to the adders $a_1$, $a_2$ and $a_3$ to correct these errors.

For the sake of brevity, the flow chart of FIG. 4 will be partially described with reference to FIG. 5. At first, if $x_1=0$ is established, it means that no error exists relating to $A_1$, $A_2$ and $P_1$, so that it is requested to proceed to the next step. If $x_1\neq 0$ and $y_1\neq 0$ are satisfied, it means that at least, either $e_2$ and $e_{p1}$ exists, so that it is requested to examine whether $x_1=y_5$ is established or not for the above decision. If $x_1=y_5$ is satisfied, it implies that the erroneous word $e_2$ relating to $A_z$ exists and that a received data is $A_2+e_2$. Accordingly, since $x_1=e_2$ is satisfied, an operation of $(A_2+e_2+x_1)$ is performed at the adder $a_2$ so that the correct word $A_2$ can be obtained. Then the delay circuits $D_{15}$ and $D_7$ are cleared and it is requested to move to the next step. When moved to the next step, $x_1=y_5=0$ is obtained. This clear operation is made for preventing an error correcting operation from being uselessly carried out again despite that the erroneous word $e_2$ has already been corrected as mentioned above, and also for preventing a miscorrection from occurring in that case. The clear operation is similarly required in other cases.

If $x_1 \neq y_5$ is obtained, it is further requested to decide whether $x_1 = y_9$ is satisfied or not. And, if $x_1 = y_9$ is satisfied, it means that the erroneous word $e_{p1}$ relating to $P_1$ exists, so that the delay circuit $D_5$ is cleared and it is requested to proceed to the next step. When $x_1 \neq y_9$ is obtained, it is also requested to proceed to the next step.

When $y_1 \neq 0$ and $x_1 = y_1$ are established, it means that the erroneous word $e_1$ relating to $A_1$ exists, so that an operation of $(A_1 + e_1) + x_1$ is performed at the adder $a_1$ to correct the error and the delay circuit $D_{15}$ is cleared in order to obtain $x_1 = 0$ at the next step.

When $(y_1 = x_1 + x_{-3})$ is established at $x_1 \neq 0$, $y_1 \neq 0$ and $x_1 \neq y_1$, it implies the existence of the erroneous words $e_1$ and $e_{-2}$ relating to $A_1$ and $A_{-2}$. Accordingly, the syndromes $x_1$ and $x_{-3}$ are respectively supplied to the adders $a_1$ and $a_3$ to correct the errors. In this case, the delay circuits $D_{15}$ and $D_{17}$ are cleared so as to obtain $x_1 = 0$ and $x_{-3} = 0$ at the next step. Thus, the error correcting logical operation is similarly carried out at the error correcting logical circuit 11 according to the flow chart of FIG. 4.

Figure 6:
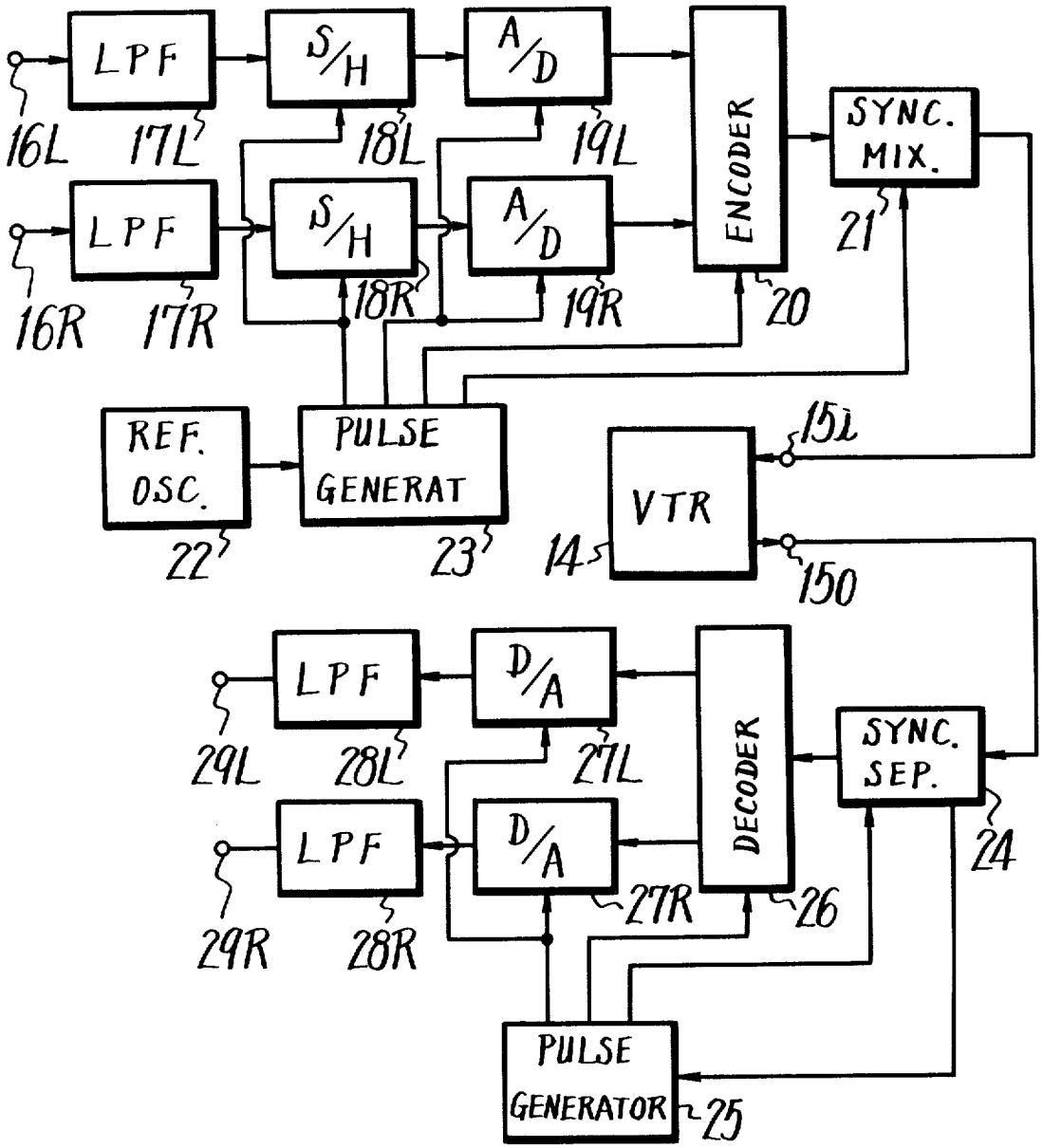
FIG. 6 is a block diagram of an audio PCM recorder, in which the system of the invention is utilized.

FIG. 6 shows an embodiment of a PCM signal recording and reproducing apparatus using a VTR to which the above described invention is applied. In FIG. 6. 14 represents a helical-scan type VTR, which is applied at its input terminal 15i with a PCM signal having the same mode as a television signal. This PCM signal is recorded on a magnetic tape through a recording system of the VTR 14, and a reproduced output from the magnetic tape is delivered through its reporducing system to its output terminal 15o.

Right- and left-channel signals of a stereo audio signal are respectively supplied from terminals 16R and 16L through low pass filters 17R and 17L to sample-and-hold circuits 18R and 18L. Thus sampled signals from the circuits 18R and 18L are fed to A-D converters 19R and 19L to derive therefrom digital code signals, which are then supplied to an encoder 20 to be described later. In the encoder 20, a parity bit is added, time base compression is carried out, and so on to obtain a serial code, which is applied to a synchronizing signal mixing circuit 21. In order to perform the above process, a reference clock oscillator 22 is provided to produce a reference clock which is fed to a pulse generating circuit 23 to produce a sampling pulse, a clock pulse for A-D conversion, a composite synchronizing signal, a control signal for the encoder, and the like. An output of the snychronizing signal mixing circuit 21 is supplied to the input terminal 15i of the VTR 14.

A reproduced PCM signal from the VTR 14 is supplied through its video output terminal 15o to a synchronizing signal separating circuit 24. A composite synchronizing signal separated at the synchronizing signal separating circuit 24 is fed to a pulse generating circuit 25, while the PCM signal from the circuit 24 is fed to a decoder 26 to be described later. After being subjected to processes such as time base expansion, error detection, and error correction in the decoder 26, the PCM signal is supplied to D-A converters 27R and 27L to derive therefrom analog outputs, which are respectively delivered through low pass filters 28R and 28L to output terminals 29R and 29L. A control signal for the decoder 26, a clock pulse for the D-A converters 27R and 27L, a timing pulse for synchronizing signal separation, and the like are produced by a pulse generating circuit 25. A time base in this case is the reproduced composite synchronizing signal.

Figure 7:
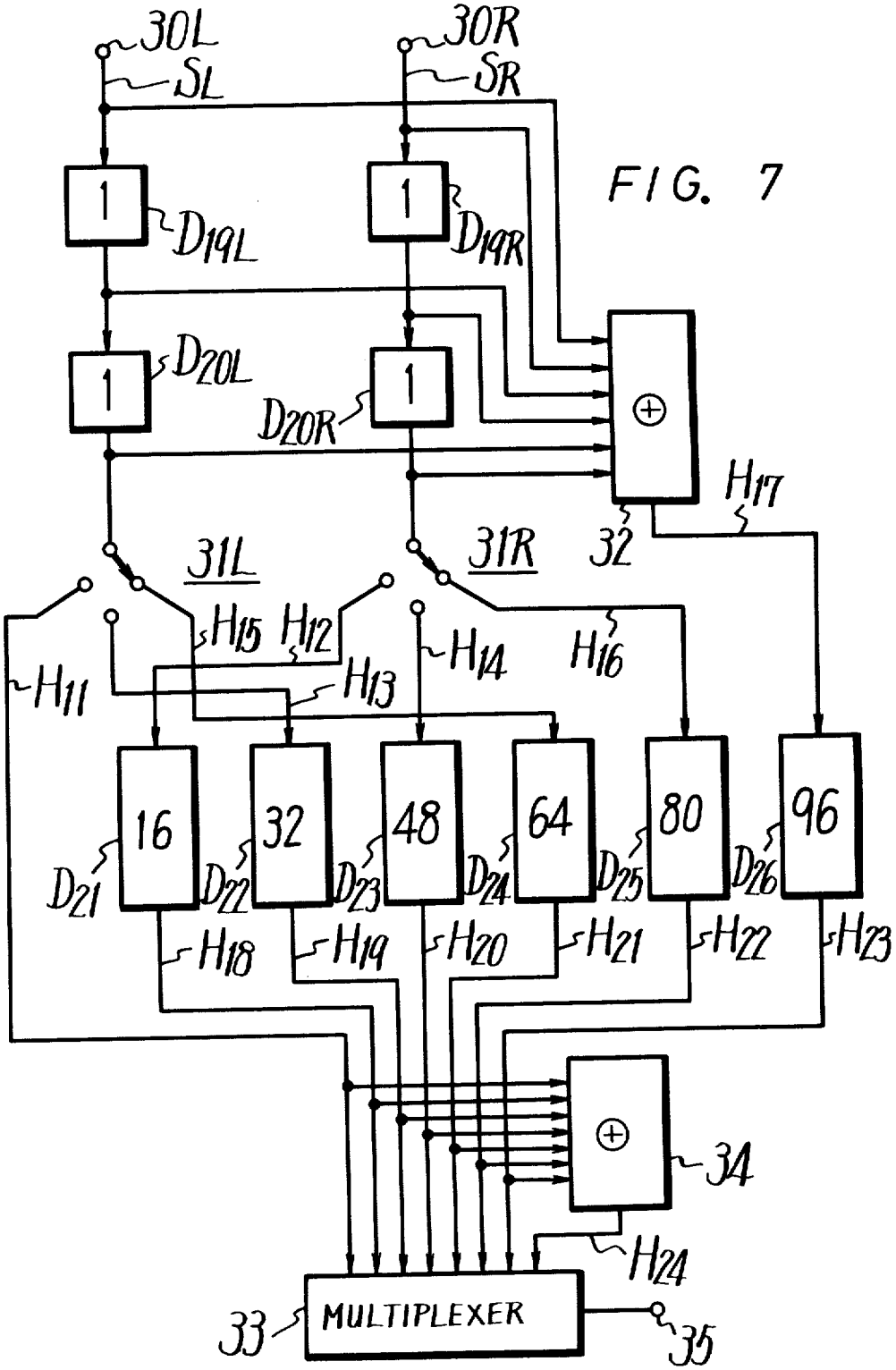
FIG. 7 is another block diagram of the encoder of the system according to this invention.

The encoder 20 is constructed as shown in FIG. 7. A PCM signal $S_R$ relating to the right channel and a PCM signal $S_L$ relating to the left channel are respectively supplied from the A-D converters 19R and 19L of FIG. 6 through terminals 30R and 30L to 1-word delay circuits $D_{19R}$ and $D_{19L}$. Outputs of these 1-word delay circuits $D_{19R}$ and $D_{19L}$ are supplied further through 1-word delay circuits $D_{20R}$ and $D_{20L}$ to input ends of switch circuits 31R and 31L. The switch circuits 31R and 31L are in synchonism to each other, and each input end thereof is sequentially connected to output ends of the corresponding switch circuit at every 1-word time. Each one word of the PCM signals $S_R$ and $S_L$, each one word which is delayed from the former by one word, and each one word which is delayed from the first signal by two words, that is, total six words are fed to an adder 32 to be added bit by bit.

A bit sequence $H_{11}$ appearing at an output end of the switch circuit 31L is supplied to a multiplexer circuit 33, while bit sequences $H_{13}$ and $H_{15}$ appearing at the other output ends of the switch circuit 31L are applied through delay circuits $D_{22}$ and $D_{24}$ to the multiplexer circuit 33. Meanwhile, bit sequences $H_{12}$, $H_{14}$ and $H_{16}$ appearing at respective output ends of the other switch circuit 31R are delivered through delay circuits $D_{21}$, $D_{23}$ and $D_{25}$ to the multiplexer circuit 33. Further, a bit sequence $H_{17}$ produced by the adder 32 is supplied through a delay circuit $D_{26}$ to the multiplexer circuit 33. If a delay amount of the delay circuit $D_{21}$ is taken as d words, delay amounts of the delay circuits $D_{22}$, $D_{23}$, $D_{24}$, $D_{25}$ and $D_{26}$ are respectively selected as 2d words, 3d words, 4d words, 5d words and 6d words. In this example, d is selected as sixteen words, so that the delay amounts of the respective delay circuits become 16 words, 32 words, 48 words, 64 words, 80 words, and 96 words. These seven bit sequences $H_{11}$ and $H_{18}$ to $H_{23}$ are also supplied to an adder 34 to be added bit by bit to produce a bit sequency $H_{24}$ consisting of a parity bit sequence Q. This bit sequence $H_{24}$ is also fed to the multiplexer circuit 33. Every one word is extracted from these eight bit sequences fed to the multiplexer circuit 33 to form a serial data, which is obtained at an output terminal 35. This serial data is applied to a time base compressing circuit (not shown) in the encoder 20 to form data-lacking intervals corresponding to a horizontal blanking period and a vertical blanking period.

Figure 9:
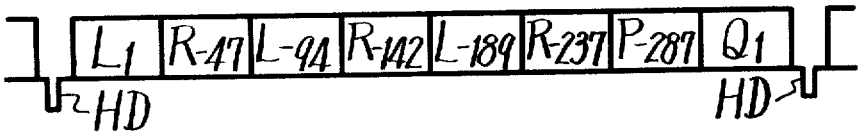
FIG. 9 is a format of the signals generated from the encoder of FIG. 7.
Figure 8:
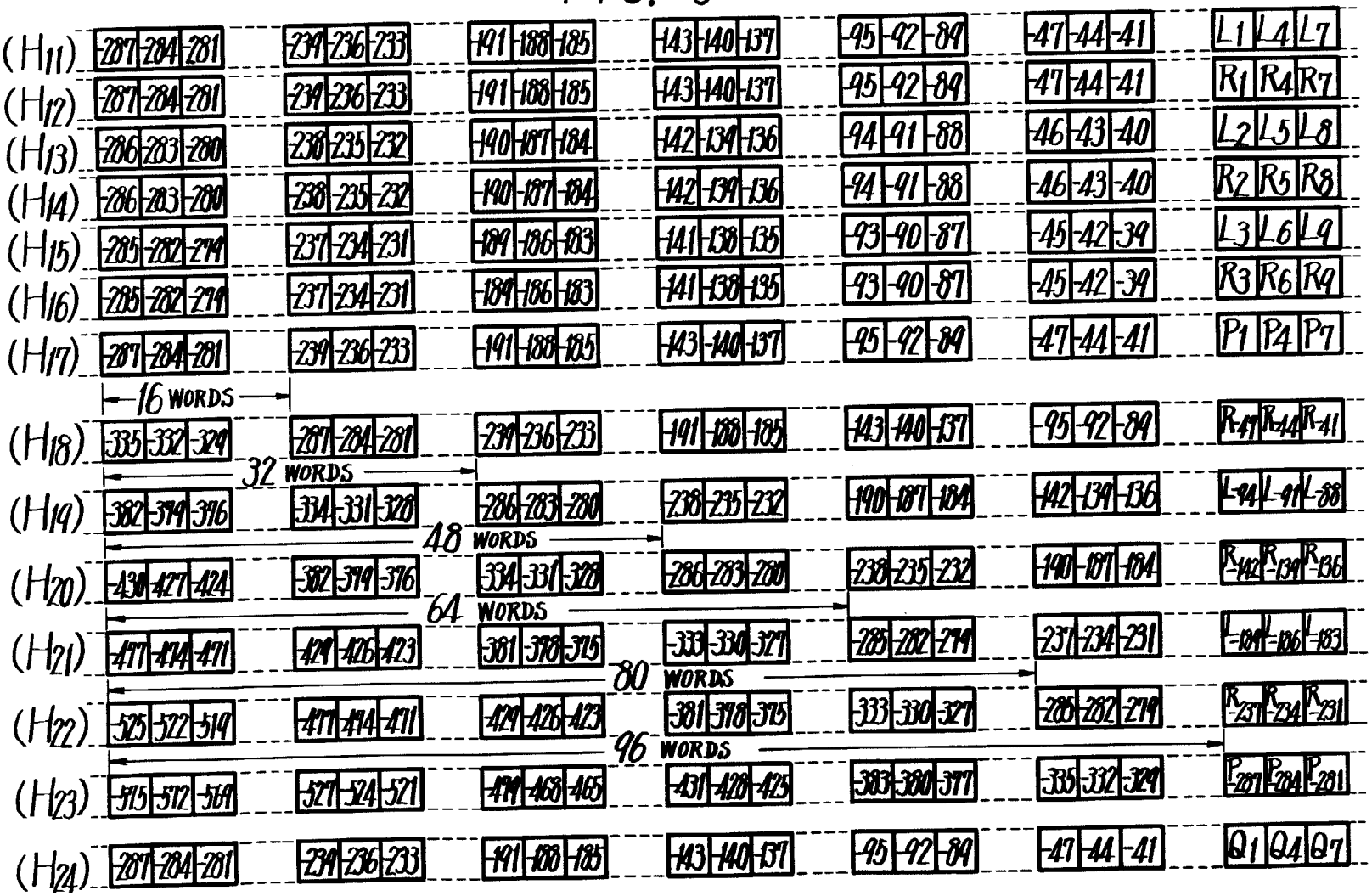
FIG. 8 shows a portion of the digital information signals appearing at the encoder of FIG. 7 and the parity signals which are formed from the digital information signals.

An operation of the encoder 20 will not be described with reference to FIG. 8 and FIG. 9. The adder 32 produces the bit sequence $H_{17}$ consisting of parity bits from six words consisting of each word of the PCM signals $S_R$ and $S_L$, each word thereof before one word from the former, and each word thereof before two words from the first word. For example, a calculation of $(L_1 \oplus R_1 \oplus L_2 \oplus R_2 \oplus L_3 \oplus R_3)$ is performed to form a parity bit sequence $P_1$ of one word. The six bit sequences $H_{11}$ to $H_{16}$ appearing at respective output ends of the switch circuits 31L and 31R and the bit sequence $H_{17}$ are shown in FIG. 8. Of these bits sequences $H_{11}$ through $H_{17}$, the bit sequences $H_{12}$ to $H_{17}$ except $H_{11}$ are respectively delayed by the delay circuits $D_{21}$ to $D_{26}$ to obtain the bit sequences $H_{18}$ to $H_{23}$. Every one word from seven bit sequences consisting of the bit sequences $H_{18}$ to $H_{23}$ and the undelayed bit sequence $H_{11}$ is supplied to the adder 34 to be added bit by bit to form the bit sequence $H_{24}$. By way of example, a calculation of $(L_1 \oplus R_{-47} \oplus L_{-94} \oplus R_{-142} \oplus L_{-189} \oplus R_{-237} \oplus P_{-287})$ is performed to obtain the parity bit sequence $Q_1$ of one word.

The multiplexer circuit 33 acts to form a serial data from every eight words located at the same timing in FIG. 8. FIG. 9 shows one example of a signal to be supplied to the VTR 14 during one horizontal period between adjacent horizontal synchronizing signals HD. If the word length is selected as sixteen bits, $8 \times 16 = 128$ bits will be inserted within one horizontal period.

Figures 10, 11:
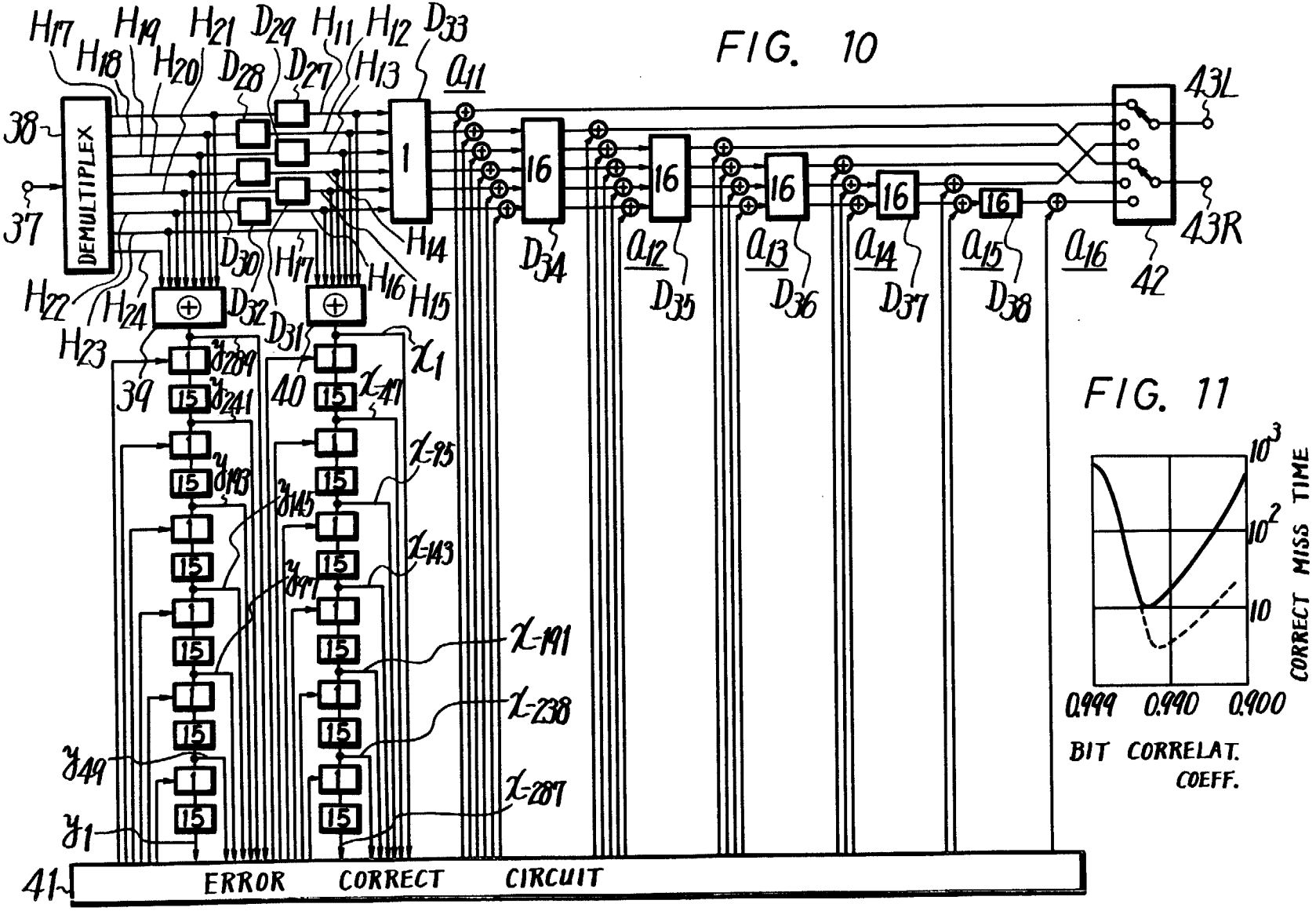
FIG. 10 is another block diagram of the recorder which is used for the digital information signals processed by the encoder of FIG. 7.
FIG. 11 is a characteristic curve showing error correcting ability of the system according to this invention.

FIG. 10 shows one example of a circuit arrangement of the decoder 26. The decoder 26 is provided with a time base expanding circuit, though not shown, to produce a serial data with data-lacking intervals being eliminated. This serial data is supplied from an input terminal 37 to a demultiplexer circuit 38 where it is converted into the eight bit sequences $H_{11}$ and $H_{18}$ respectively in a time relation shown in FIG. 8. Each one word of these bit sequences is supplied to an adder 39 where they are added bit by bit to form a syndrome. Meanwhile, delay circuits $D_{27}$ to $D_{32}$ are provided so as to cancel the differences of delay times between the respective bit sequences in the encoder and those in the decoder. Thus, the bit sequences $H_{11}$ and $H_{18}$ to $H_{23}$ are converted into the seven bit sequences $H_{11}$ to $H_{17}$ respectively in a time relation shown in FIG. 8 by passing through these delay circuits $D_{27}$ to $D_{32}$ and each one word of the above bit sequences $H_{11}$ to $H_{17}$ is fed to an adder 40 where they are added bit by bit to form a syndrome. Further, the bit sequences $H_{11}$ to $H_{16}$ consisting of information bit sequences are fed through a 1-word delay circuit $D_{33}$ to an error correcting adder group $a_{11}$ consisting of six adders. Similarly, 16-word delay circuits $D_{34}$, $D_{35}$, $D_{36}$, $D_{37}$ and $D_{38}$ and error correcting adder groups $a_{12}$, $a_{13}$, $a_{14}$, $a_{15}$ and $a_{16}$ are respectively provided in turn. Thus corrected information bit sequences are fed to a switch circuit 42 to be converted into right and left PCM signals, which are respectively obtained at output terminals 43R and 43L.

The adders 39 and 40 are each connected at its output side with a series circuit consisting of six 1-word delay circuits and six 15-word delay circuits which are arranged in alternate manner. Syndromes are derived from the last stages of these series circuits and from predetermined interstate positions thereof, and thus derived syndromes are applied to an error correcting logical circuit 41.

The above embodiment of this invention has a conception based upon the enlargement of the embodiment as described previously. Through the detailed description of an error correcting operation of the decoder is omitted, when syndromes $y_{289}$ and $x_1$ are respectively generated from the adders 39 and 40, syndromes $y_{241}$, $y_{193}$, $y_{145}$, $y_{97}$, $y_{49}$, $y_1$ and $x_{-47}$, $x_{-95}$, $x_{-143}$, $x_{-191}$, $x_{-239}$, $x_{-287}$ appear as shown in FIG. 10 and these syndromes are applied to the error correcting logical circuit 41.

According to this invention mentioned above, the digital signal transmitting method effective in the correction of burst errors can be achieved. As another type of convolutional code, there is considered a code formation using an error-detecting code, for example, a CRC (cyclic redunduancy check) code in place of the bit sequence consisting of the parity bit sequence Q. In this invention, however, the error correcting ability can be enhanced as compared with the above system using such a code formation. For the explanation of comparison in error correcting ability, a graph is shown in FIG. 11 in which ordinate represent number of correction compensation missing times (number of times per hour) and abscissa represents bit correlation coefficient. According as the bit correlation coefficient approaches 0.999, burst error increases, while according as it approaches 0.900, random error increases. A curve shown in FIG. 11 by a solid line represents a case of using the CRC code instead of the parity bit sequence Q. According to this invention, as shown by a dotted line, the number of correction-compensation missing times can be more reduced and also random error can be more corrected or compensated for.

In the first embodiment mentioned previously, the parity bit sequence Q is added at every three words, while in the second embodiment, the parity bit sequence Q is added at every seven words. However, it is also possible to add the parity bit sequence Q at every given number of words other than the above values.

It will be apparent that many modifications and variations may be effected without departing from the scope of the novel concepts of this invention.

We claim as our invention:

1. A digital signal transmission system comprising:

means for providing a first error correcting signal from generation elements comprised of a plurality of words of digital information;

delay means for relatively delaying said plurality of words of digital information so as to have delay times that are different from each other;

means for providing a second error correcting signal from a plurality of generation elements comprised of said relatively delayed words and first error correcting signal; and means for transmitting said relatively delayed words of digital information and first and second error correcting signals *as serial data sequences, each sequence containing first and second error correcting signals and relatively delayed words of digital information, with any particular one of said error correcting signals and the respective generation elements therefor appearing in different ones of said serial data sequences.*

2. A digital signal transmission system according to claim 1; in which said means for providing the first error correcting signal includes a modulo-two-adding means.

3. A digital signal transmission system according to claim 2; in which said means for providing the second error correcting signal includes another modulo-two-adding means.

4. A digital signal transmission signal according to claim 3; in which said means for providing the second error correcting signal further includes additional delay means for relatively delaying said first error correcting signal in respect to said relatively delayed words of digital information, and said other modulo-two-adding means receives the delayed first error correcting signal and at least one of the relatively delayed words of digital information.

5. A digital signal transmission system comprising:

means acting on a plurality of words of digital information to form a first [parity] *error checking* signal therefrom;

first delay means for relatively delaying said words of digital information so as to have delay times that are different from each other;

means for providing a second [parity] *error checking* signal from a plurality of generation elements comprised of said relatively delayed words of digital information and said first [parity] *error checking* signal;

means for transmitting and receiving said relatively delayed words of digital information and first and second [parity] *error checking* signals;

means for providing a first syndrome from a plurality of generation elements comprised of the received first and second [parity] *error checking* signals and words of digital information;

second delay means for relatively delaying the received words of digital information in a fashion reverse to that effected by said first delay means;

means connected to said second delay meas for providing a second syndrome from generation elements comprised of the words of digital information as relatively delayed by said second delay means and said first [parity] *error checking* signals;

detecting means receiving said first and second syndromes for detecting the received words of digital information having an error; and means for correcting the error of the received words of digital information in response to said syndromes.

6. A digital signal transmission system according to claim 5; in which *said first and second error checking signals are parity signals, and* said means for providing said first and second [parity] *error checking* signals respectively include first and second modulo-two-adders.

7. A digital signal transmission system according to claim 6; in which said means for providing the second parity signal further includes third delay means for relatively delaying said first parity signal in respect to said relatively delayed word of digital information and said second modulo-two-adder receives the delayed first parity signal and at least one of the relatively delayed words of digital information.

8. A digital signal transmission system according to claim 6; in which said means for providing said first and second syndromes respectively include third and fourth modulo-two-adders.

9. A digital signal transmission system according to claim 8; in which said relatively delayed words of digital information and said first and second parity signals are serially transmitted and received.

10. A digital signal transmission system according to claim 8, in which said detecting means includes comparing means for comparing the outputs of said third and fourth modulo-two-adders, and providing an error signal as an output of the comparing means.

11. A digital signal transmission system according to claim 10, in which said correcting means includes a fifth modulo-two-adder for adding said error signal with the output of one of said third and fourth modulo-two-adders.

12. In apparatus for reproducing a [recorded] *transmitted* digital signal comprised of words of digital information which are relatively delayed to have *delay* times different from each other, a first [parity] *error checking* signal generated from generation elements comprised of said words of digital information, and a second [parity] *error checking* signal generated from a plurality of generation elements comprised of said relatively delayed words and first [parity] *error checking* signal; a [reproduced] *reproducing* signal processing circuit comprising:

means for providing a first syndrome from a plurality of generation elements comprised of the reproduced words of digital information and first and second [parity] *error checking* signals;

delay means for relatively delaying the reproduced words of digital information in a fashion reverse to that with which said words were [recorded] *relatively delayed for transmission;* means connected to said delay means for providing a second syndrome from generation elements comprised of the reproduced words of digital information as relatively delayed by said delay means and said first [parity] *error checking* signal;

detecting means [receiving said frist and second syndromes] for detecting [therefrom] those reproduced words of digital information having [an] *at least one word* error; and;

means for correcting a detected *at least one word* error in the reproduced words of digital information [in response to said syndromes] *with said first and second syndrome in response to a corresponding output from said detecting means.*

13. The apparatus according to claim 12; in which *said first and second error checking signals are respectively first and second parity signals,* said first parity signal is a modulo-two summation of said words of digital information and said second parity signal is a modulo-two summation of said first parity signal and at least one of the relatively delayed words of digital information; and in which said means for providing said first and second syndromes includes first and second modulo-two-adders, respectively.

14. The apparatus according to claim 13; in which said detecting means includes comparing means for comparing the outputs of said first and second modulo-two-adders and providing an error signal as an output of the comparing means.

15. The apparatus according to claim 14; in which said means for correcting includes an additional modulo-two-adder for adding said error signal to the output of one of said first and second adders.

16. A digital signal transmission system comprising:

means for providing a plurality of words of digital information;

means for arranging said words of digital information in a first state of arrangement;

means for providing a first error correcting signal from generation elements comprised of said words of digital information in said first state;

delay means for relatively delaying said plurality of words of digital information so as to have delay times that are different from each other, and for arranging the words of digital information in a second state of arrangement;

means for providing a second error correcting signal from a plurality of generation elements comprised of said relatively delayed words and first error correcting signal; and means for transmitting said words of digital information and first and second error correcting signals *as serial data sequences, each sequence containing first and second error correcting signals and relatively delayed words of digital information, with any particular one of said error correcting signals and the respective generation elements therefor appearing in different ones of said serial data sequences.*

17. A digital signal transmission system according to claim 16; further comprising:

means for receiving the transmitted words of digital information and first and second error correcting signals;

means for rearranging the received words of digital information into said second state;

means for providing a first syndrome from a plurality of generation elements comprised of the first and second error correcting signals and the rearranged words of digital information in said second state;

means for arranging the received words of digital information into said first state;

means for providing a second syndrome from said first error correcting signal and the rearranged words of digital information in said first state;

detecting means receiving said first and second syndromes for detecting the received words of digital information having an error; and means for correcting the error of the received words of digital information in response to said syndromes.

18. A carrier storing digital information comprised of words of digital information, a first [parity] *error checking* signal having said words of digital information as its generation elements and a second [parity] *error checking* signal formed of a plurality of generation elements comprised of said words and first [parity] *error checking* signal which are relatively delayed [to have times] *by* different *times* from each other *, said words of digital information and said error checking signals being stored as serial data sequences each containing first and second error checking signals and relatively delayed words of digital information with said error correcting signals and the respective generation elements appearing in different ones of said serial data sequences.*

*19. The apparatus according to claim 12; in which said first error checking signal is additionally delayed with respect to said relatively delayed words of digital information.*

* * * * *